(12) United States Patent
Miyamoto

(10) Patent No.: US 6,662,363 B1
(45) Date of Patent: Dec. 9, 2003

(54) METHOD, SYSTEM AND RECORDING MEDIUM FOR INSTALLING SOFTWARE IN COMPUTER

(75) Inventor: Hiromu Miyamoto, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/365,467

(22) Filed: Aug. 2, 1999

(30) Foreign Application Priority Data

Jun. 15, 1999 (JP) .......................................... 11-168367

(51) Int. Cl.$^7$ ............................ G06F 9/445; G06F 9/44
(52) U.S. Cl. ...................................... 717/174; 717/168
(58) Field of Search ........................ 717/11, 174, 168, 717/169–173, 175–178; 705/44, 1, 59; 380/28; 713/200, 100; 709/221; 710/5

(56) References Cited

U.S. PATENT DOCUMENTS

| | | | | |
|---|---|---|---|---|
| 4,953,209 A | * | 8/1990 | Ryder et al. ................... 705/59 |
| 5,490,216 A | * | 2/1996 | Richardson, III ............ 705/59 |
| 5,881,236 A | * | 3/1999 | Dickey ........................ 709/221 |
| 6,009,401 A | * | 12/1999 | Horstmann ..................... 705/1 |
| 6,067,582 A | * | 5/2000 | Smith et al. ................... 710/5 |
| 6,075,862 A | * | 6/2000 | Yoshida et al. ................ 380/28 |
| 6,219,652 B1 | * | 4/2001 | Carter et al. ................... 705/59 |
| 6,226,747 B1 | * | 5/2001 | Larsson et al. ............. 713/200 |
| 6,247,128 B1 | * | 6/2001 | Fisher et al. ................ 713/100 |
| 6,347,397 B1 | * | 2/2002 | Curtis ........................ 717/170 |

* cited by examiner

*Primary Examiner*—Antony Nguyen-Ba
(74) *Attorney, Agent, or Firm*—Morrison & Foerster LLP

(57) ABSTRACT

For installation of desired software, the software is first written into a memory, and then a user's selection is received which indicates whether or not the user agrees to contents of an agreement concerning the software. When the user has agreed to the contents of the agreement, the software written in the storage device is maintained as it is, and in this way, the intended installation of the software can be completed properly. When, on the other hand, the user has not agreed to the contents of the agreement, the written software is deleted from the memory and the intended installation is abandoned. Thus, whenever the user indicates his or her intention to agree to the contents of the agreement, the software has already been properly installed (except in very rare cases), so that the user is allowed to actually use the software with a maximized possibility of success without being deceived in his or her expectations. The display of the contents of the agreement and determination of the user's selection to agree or to not agree to the contents of the agreement may be performed only after ascertaining that the software written in the memory can be actually started up.

21 Claims, 3 Drawing Sheets

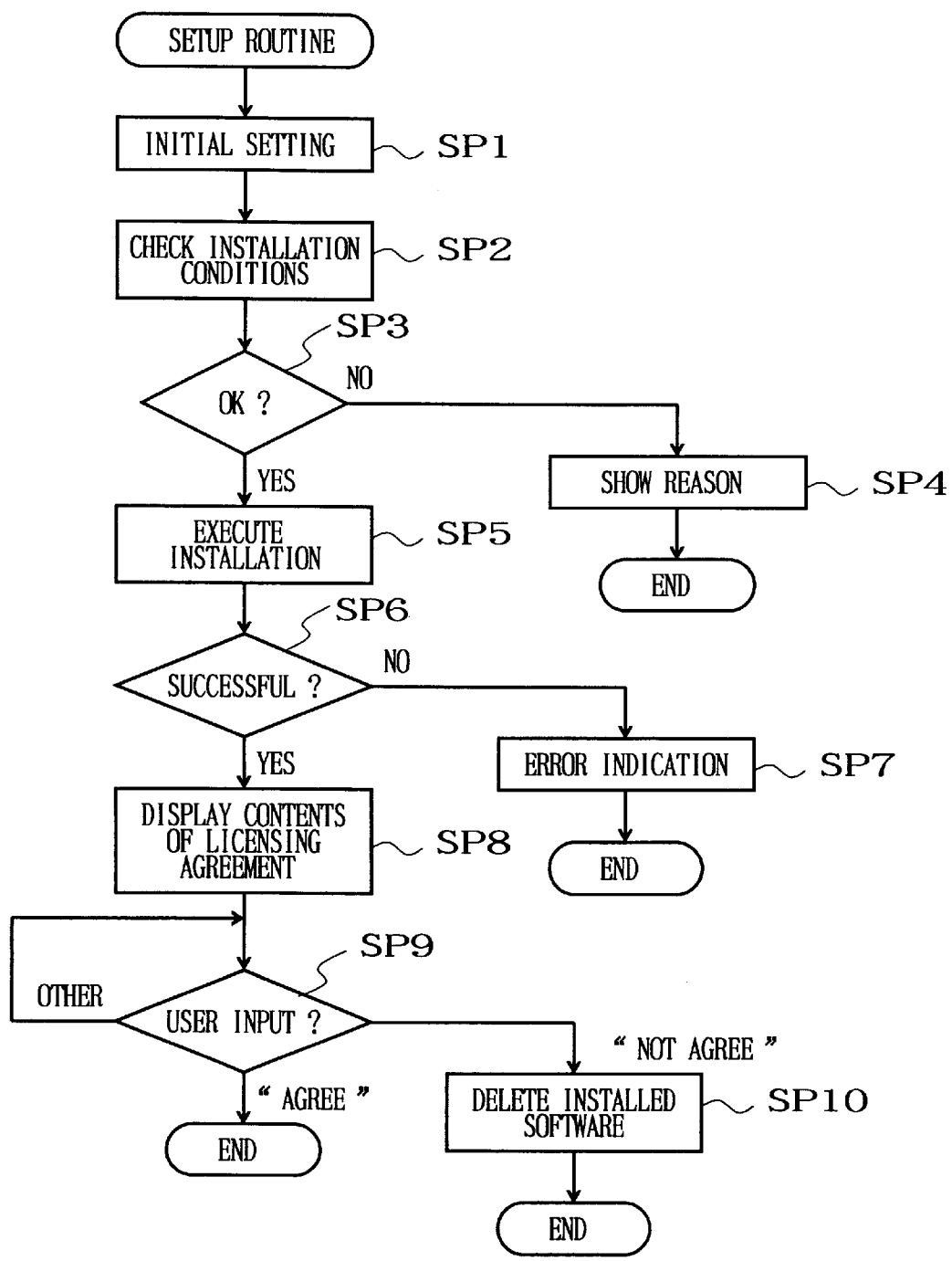
F I G. 2

METHOD, SYSTEM AND RECORDING MEDIUM FOR INSTALLING SOFTWARE IN COMPUTER

BACKGROUND OF THE INVENTION

The present invention relates to a method, system and recording medium for installing software in a computer which can be suitably used to promote sale and distribution of the software product.

Generally, for installing desired software in a computer or the like, a user first acquires a group of files necessary for the installation, e.g., from a CD-ROM or other recording medium, or Internet home page. Then, the user runs, on a particular computer into which the software is to be installed, a predetermined setup program (e.g., "Setup.exe") contained in the acquired group of files.

In many of such setup programs, users are usually asked to enter into a "licensing agreement" prior to the installation of the desired software. FIG. 3 is a flow chart explanatory of a specific example of the conventional setup program used for such a purpose. At first step SP101 of FIG. 3, a predetermined initial setting process is carried out. Then, at step SP102, a predetermined screen for a licensing agreement concerning the software to be installed (hereinafter also called "new software") is caused to show up on a computer display. In this licensing agreement screen are displayed detailed contents of the licensing agreement and two buttons labeled "Agree" and "Not Agree".

At next step SP103, the setup routine waits until one of the "Agree" and "Not Agree" buttons is depressed or activated by the user. If the user has activated the "Agree" button, the setup routine proceeds to step SP104 to execute the installation of the software, but if the user has activated the "Not Agree" button, then the installation of the software is not executed or canceled.

However, with the above-described conventional technique, the new software sometimes fails to be installed properly despite the user's activation of the "Agree" button to enter into the licensing agreement. Such a failure of the software installation would occur in situations where 1) the storage device of the computer, into which the new software is to be installed, does not have an enough empty storage space for the new software, 2) the type or version of the operating system currently installed in the computer does not properly fit the new software, 3) there is already installed, in the computer, other software with which the new software can not coexist, 4) other software necessary for operation of the new software is not installed in the computer, 5) the new software can not operate appropriately due to some bug in the setup program or in already-installed other software, and so on.

In the event of such an installation failure, the setup program usually displays an error message and then terminates the routine. Further, the setup program would also sometimes come to an abnormal end due to various other unpredictable reasons. In such cases, the user can not use the software in spite of having entered into the licensing agreement, which is very unreasonable.

SUMMARY OF THE INVENTION

It is therefore an object of the present invention to provide a software-installing method, recording medium and system or device which allow every user, having entered into a licensing agreement, to actually use the software with a maximized possibility of success.

In order to accomplish the above-mentioned object, the present invention provides a method of installing software in a computer, which comprises the steps of: writing the software into a storage device of the computer; displaying contents of an agreement concerning the software after the step of writing; receiving a user's selection as to whether or not to agree to the contents of the agreement; and deleting the software written in the storage device, when the user has not agreed to the contents of the agreement.

For installation of given software in accordance with the present invention, the software to be installed is first written into the storage device, and then a user's selection is received which indicates whether or not the user agrees to contents of an agreement concerning the software. The present invention is substantially different from the conventionally known techniques in the order of the installation procedures. Namely, the software, once written in the storage device, would be undesirably left stored in the storage device even when the user has not agreed to the contents of the agreement. To avoid such an inconvenience, the present invention has improved the installation procedures such that the software written in the storage device is compulsorily deleted from the storage device when the user has not agreed to the contents of the agreement. When, on the other hand, the user has indicated his or her intention, i.e., made a selection, to agree to the contents of the agreement, the software written in the storage device is maintained as it is, and in this way, the installation of the software can be completed. Thus, whenever the user indicates his or her intention to agree to the contents of the agreement, the software has already been properly installed in the storage device (except in very rare cases), so that the user is allowed to make use of the software with a maximized probability of success without being deceived in his or her expectations.

In one implementation, the step of writing, the step of displaying, the step of receiving and the step of deleting may be executed sequentially by the computer in accordance with a predetermined setup program.

In another implementation, the step of writing the software may be executed by the computer in accordance with a predetermined setup program, and the step of displaying, the step of receiving and the step of deleting may be executed by the computer running the software written in the storage device. As still another example, the method of the present invention may further comprise a step of, after the step of writing, waiting until the software written in the storage device is started up, and the step of displaying, the step of receiving and the step of deleting may be executed in accordance with instructions from the software thus started up. In yet another implementation, the method of the present invention may further comprise a step of, after the step of writing, automatically starting up the software written in the storage device, and the step of displaying, the step of receiving and the step of deleting may be executed in accordance with instructions from the software thus started up. In each of these examples, the confirmatory display of the contents of the agreement and determination of the user's selection to agree or to not agree to the displayed contents of the agreement are performed only after ascertaining that the software written in the storage device can be actually started up on the computer. Thus, each of these examples achieves highly reliable and user-friendly installation procedures.

In yet another implementation, a non-completely-operable version of the software, obtained by changing part of a completely-operable version of the software to be installed, may be stored in the storage device, and, only when the user's selection has been made to agree to the contents of the agreement, the changed part of the non-completely-operable version may be restored back to its original or pre-change condition so that the completely-operable version of the software is preserved in the storage device for use after the user's selection to agree to the contents of the agreement.

In still another implementation, a non-completely-operable version of the software, obtained by changing part of a completely-operable version of the software to be installed, may be stored in the storage device, and when the user's selection has been made to not agree to the contents of the agreement, the software with the changed part (i.e., the partly-changed software) may be executed as it is. In this case, this partly-changed software will be executed as a sort of demonstration of how it works, which can be expected to effectively attract consumers' interest in the software.

The present invention may be implemented not only as the method of installing software as set forth above, but also as a computer system capable of installing software through novel installation procedures. The present invention may also be practiced as a program for execution by a processor such as a CPU and a DSP, as well as a recording medium storing such a program.

BRIEF DESCRIPTION OF THE DRAWINGS

For better understanding of the object and other features of the present invention, its preferred embodiments will be described in greater detail hereinbelow with reference to the accompanying drawings, in which:

FIG. 2 is a flow chart explanatory of a setup program employed in the embodiment of FIG. 1.

DETAILED DESCRIPTION OF THE PREFERRED EMBODIMENTS

Figure 1:
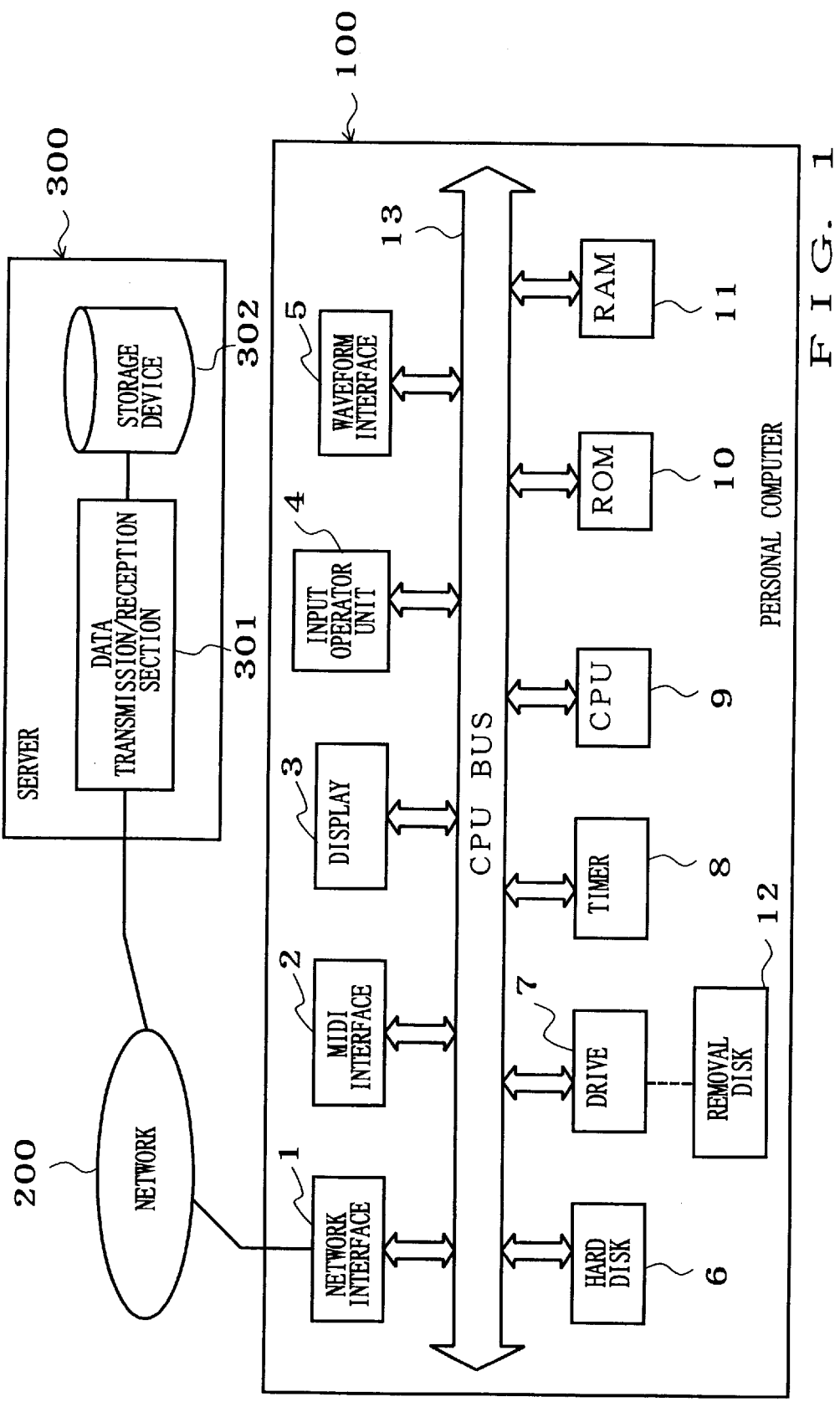
FIG. 1 is a block diagram showing a computer system in accordance with a preferred embodiment of the present invention.
Figure 3:
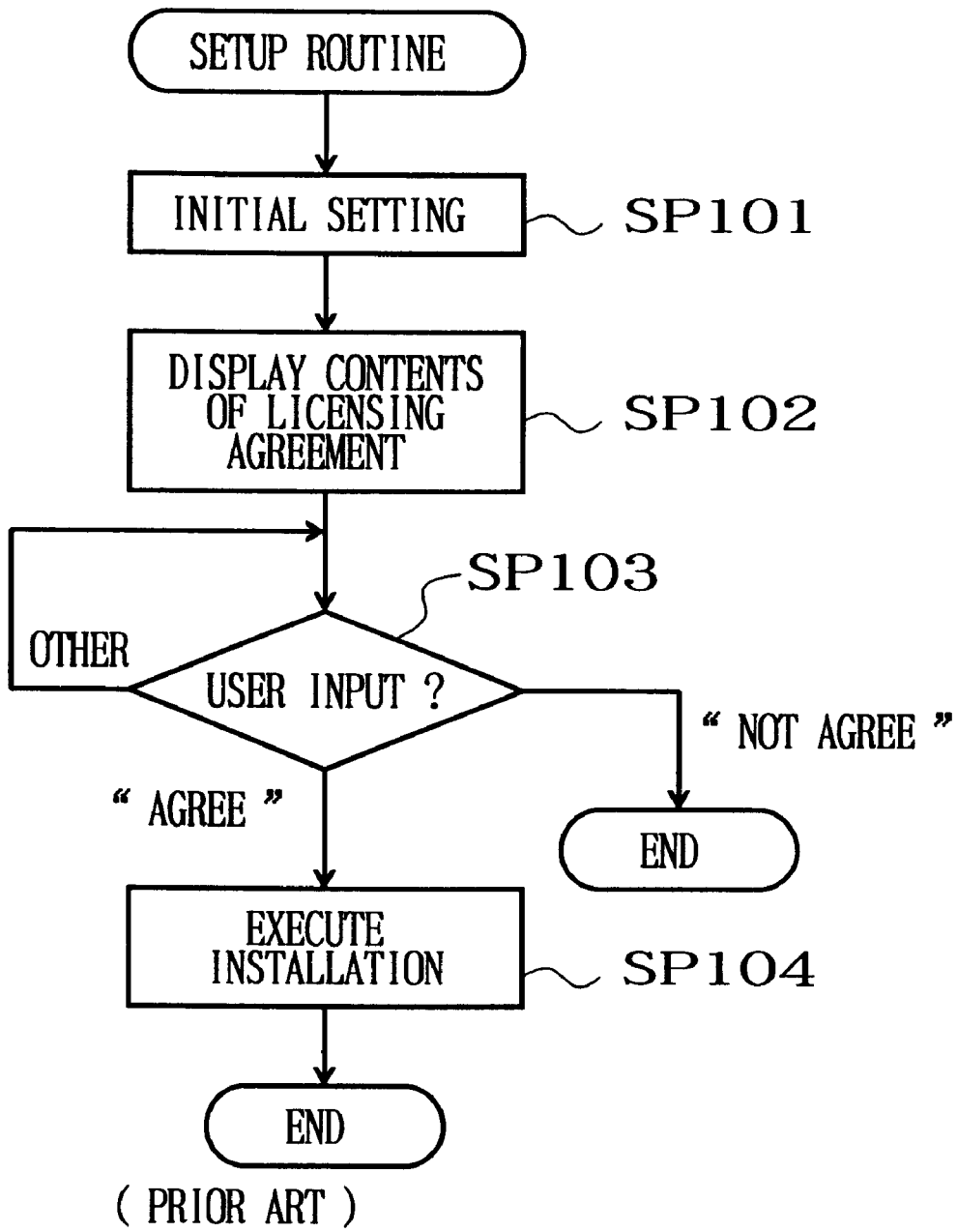
FIG. 3 is a flow chart explanatory of a conventional setup program.

FIG. 1 is a block diagram showing a computer system in accordance with a preferred embodiment of the present invention. Personal computer 100 includes a CPU (Central Processing Unit) 9 which controls operation of various components of the personal computer 100. Reference numeral 1 represents a network interface for communicating various information with a communication network 200. The personal computer 100 also includes a MIDI 2 interface, which is based on the MIDI (Musical Instrument Digital Interface) standard, is connected with MIDI devices, such as a keyboard and a tone generator, for exchange MIDI data with these MIDI devices. Reference numeral 3 denotes a display which visually displays various information to the user. Reference numeral 4 denotes an input operator unit (input device) including a keyboard, a mouse etc., which supplies the CPU 9 with various information on the basis of a user's input operation.

Further, in the personal computer 100, a ROM 10 has prestored therein various programs and data, which includes an initial program loader for starting up the personal computer 100, and a RAM 11 is accessable by the CPU 9 to read and write various data thereon. Reference numeral 5 denotes a waveform interface which receives analog tone waveform signals via a microphone or the like and stores the waveform signals into the RAM 11 after converting them into PCM (Pulse Code Modulated) information. The waveform interface 5 also converts the PCM information, read out from the RAM 11, into analog signals and causes the converted analog signals to be audibly reproduced or sounded through a sound system (not shown).

The personal computer 100 also includes a hard disk 6, onto which are stored an operating system, drivers, application programs, etc. deployed in the RAM 11. Reference numeral 7 denotes a disk drive which reads and writes data on a removable disk 12 such as a floppy disk. Timer 8 issues a timer interrupt signal to the CPU 9 every predetermined time. Reference numeral 300 denotes a server, which includes a data transmission/reception section 301 for transmitting and receiving various data to and from the communication network 200, and a data storage device 302 for storing software to be supplied to users.

Next, a description will be made about specific example of behavior of the preferred embodiment. First, the user acquires a group of files necessary for installing desired software (hereinafter also called "new software") in the personal computer 100. Namely, if these necessary files are stored in the removable disk 12, then the user sets the removable disk 12 in the disk drive 7. If, however, the necessary files are stored in the data storage device 302 of the server 300, then they are downloaded from the server 300 onto the hard disk 6.

It will be appreciated that a variety of software may be installed into the computer system, typical examples of which include a sequencer that is an application program for recording and reproducing music piece data in the MIDI format and is activated by clicking on an icon for the sequencer or the corresponding music piece data, a software tone generator that is installed as a driver in the operating system and is started up when the application program, such as the sequencer, is about to output MIDI data.

The above-mentioned necessary files contain a predetermined setup program (e.g., "Setup.exe"), and the user executes this setup program. The following paragraphs describe operation of the setup program (setup routine), with reference to a flow chart of FIG. 2. At first step SP1 of the setup routine, a predetermined initial setting process is carried out. At next step SP2, a determination is made as to whether or not predetermined installation conditions are currently satisfied by the personal computer 100.

Specifically, among the installation conditions to be checked at step SP2 are 1) whether or not the hard disk 6 has enough empty storage space for the new software, 2) whether or not the type or version of the operating system currently installed in the computer 100 properly fits the new software, 3) whether or not there is already installed, in the computer 100, other software with which the new software can not coexist, 4) whether or not other software necessary for operation of the new software is currently installed in the computer, and so on.

After step SP2, the setup routine moves on to step SP3, where it is ascertained whether or not all the conditions necessary for the installation of the new software have been met. With a negative (NO) answer at step SP3, the setup routine branches to step SP4, where the reasons why the installation is not allowed are shown on the display 3 and the routine is terminated. With an affirmative (YES) answer, however, the setup routine goes to step SP5 in order to execute the installation of the new software. Namely, at step SP5, a particular folder, into which the new software is to be installed, is designated by the user, in response to which the files read out from the CD-ROM or downloaded from the server are copied into the designated folder while being decompressed as necessary and also registries and various system files of the operating system are modified as necessary.

At following step SP6, a determination is made as to whether or not the installation of the new software has been successfully executed, i.e., all the necessary files have been transferred completely to the computer and the necessary modifications of the registries and various system files of the operating system have been completed appropriately. If the software has not been installed successfully due to some reason at step SP5 above, then a negative determination is made at step SP6, so that the setup routine branches to step SP7. At step SP7, a screen indicating that an error has occurred is shown on the display 3, and the setup routine is terminated. If, on the other hand, the software has been installed properly at step SP5, an affirmative determination is made at step SP6, so that the setup routine moves on to step SP8.

At step SP8, detailed contents of the licensing agreement to be concluded are shown on the display 3 along with two bottons labeled "Agree" and "Not Agree". At next step SP9, the setup routine waits until one of the "Agree" and "Not Agree" buttons is activated by the user. Once one of the "Agree" and "Not Agree" buttons is activated, information indicative of the activated button (selection information) is stored into the RAM 11, and the setup routine takes a different route in accordance with the selection information.

Namely, when the "Not Agree" button has been activated by the user, the setup routine goes to step SP10 in order to delete the software installed at step SP5. When, on the other hand, the "Agree" button has been activated by the user, the setup routine is terminated immediately, so that the user is allowed to start up the newly installed software.

According to the preferred embodiment of the present invention, as described above, the predetermined installation conditions are checked beforehand at step SP2, whether or not the new software has been successfully installed is determined at step SP6 after the installation of the new software at step SP5, and the contents of the licensing agreement are visually shown on the display 3 at step SP8 only when all these steps have been completed appropriately. In this manner, any users, having entered into the licensing agreement, are allowed to make use of the newly installed software with a maximized possibility of success without being deceived in their expectations.

The present invention is not limited to the above-described embodiment and can be modified in a variety of ways as exemplified below.

Modification (1): The preferred embodiment has been described above as showing the contents of the licensing agreement at step SP8 when step SP6 determines that the installation of the new software has been successful. Alternatively, in response the determination at step SP6 that the installation of the new software has been successful, the setup routine may be terminated immediately to wait until the thus-installed software is started up, and then the operations of steps SP8 to SP10 may be carried out only after the thus-installed new software is first started up. To this end, upon the first startup of the installed software, the software may issue an instruction to carry out the yet-to-be-executed operations of steps SP8 tp SP10. In an alternative, the new software may itself previously contain an auxiliary setup program corresponding to the operations of steps SP8 tp SP10 so that the auxiliary setup program is automatically executed upon the first startup of the software after the installation. In the former case, the setup routine may be suspended in response to the determination at step SP6 that the installation has been successful, so as to automatically start up the installed software in such a manner that the setup routine is resumed at step SP8 in response to the startup of the installed software and in accordance with an instruction from the software. This modification ensures that the installed new software is in an actually activatable condition at least when the user is about to enter into the licensing agreement. Thus, this modification can allow every user, having entered into licensing agreement, to actually use the new software with an even higher possibility of success.

Modification (2): In the above-described embodiment (see FIG. 2), when the power to the personal computer 100 is turned off during the wait state at step SP9 or when the setup routine is terminated compulsorily due to some reason, it is likely that the new software will be brought to a usable condition although the user has not yet agreed to the contents of the licensing agreement. To avoid this inconvenience, a non-completely-operable version of the software may be made by changing part of a completely-operable version of the new software and then prestored for retrieval at step SP5, and the changed part of the non-completely-operable version may be restored to its original or pre-change in response to activation of the "Agree" button at step SP9 so that the new software restored to its original, completely-operable condition is preserved for use after the user's "Agree" selection. To this end, a step of restoring the changed part of the new software to its pre-change condition is inserted in the "Agree" route taken from step SP9, although not specifically illustrated in the figure.

In this case, the new software may b e partly changed in any desired manner or to any desired extent. For example, at least one selected part of the new software may be changed in such a way that the software is made completely inoperable, or that the software is made operable partly even though its complete operation is not guaranteed any longer. The latter example of the partial change, which achieves partial or incomplete operation of the new software, will be particularly useful for such a situation as set forth below as Modification (3).

Modification (3): Similarly to Modification (2) above, the new software with at least one part changed (partly-changed software) is installed at step SP5 of FIG. 2, rather than the original, completely-operable version of the software. Step SP10 (for deleting the written software) shown in FIG. 2 is omitted here; that is, in place of such step SP10, this modification includes a step of executing the partly-changed software as its is. More specifically, if the user has made a selection to "Not Agree" to the displayed contents of the licensing agreement as determined at step SP9 of FIG. 2, the partly-changed software currently stored in the memory is automatically executed just as it is. In this case, the stored partly-changed software is operable only partly, and execution of this partly-changed or partly-operable software can provide the user with a sort of demonstration of how it generally works. If the software in question is music software, for example, part of a music piece can be performed as a demonstration, or if the software in question is game software, part of the game can be played. Thus, even when the user has indicated his or her intention to "Not Agree" to the contents of the licensing agreement, this modification can effectively attract the user's interest in the software or even arouse the user's appetite for buying the software, by thus executing the partly-changed software for a demonstration to the user. In this modification, the partly-changed software left stored in the memory can also be executed at any desired time in response to a user's selection after the "Not Agree" selection. It is preferable that the contents of the licensing agreement be displayed at any desired time during the execution of the partly-changed software, such as at the beginning or end of the execution of the partly-changed software, to allow the user to again make the "Agree" or "Not Agree" selection. Then, once the user has made a selection to "agree" to the contents of the licensing agreement, the partly-changed software is restored to its completely-operable condition in the same manner as in Modification 2. Note that although modification (3) has been described above as including, in place of step SP10 of FIG. 2, automatically executing the partly-changed software, this modification is not necessarily limited to the automatic execution. Namely, the partly-changed software left stored in the memory may be executed only when the user has manually instructed the execution of the partly-changed software.

In summary, the present invention is characterized in that the contents of the licensing agreement is displayed after completion of the installation etc. of the new software, and this inventive arrangement allows every user, having entered into the licensing agreement, to actually use the licensed software with a maximized possibility of success.

What is claimed is:

1. A method of installing software in a computer comprising the steps of:
    determining whether the computer satisfies a predetermined installation condition;
    if the predetermined installation condition is not satisfied, displaying the reasons for failing to satisfy the predetermined installation condition;
    if the predetermined installation condition is satisfied, then executing the software installation and determining whether the software installation is successful;
    if the software installation is determined to be unsuccessful, displaying an error indication indicating that the software installation is unsuccessful;
    if the software installation is determined to be successful, then thereafter displaying contents of an agreement concerning the installed software;
    receiving a user's selection as to whether or not to agree to the contents of the agreement; and
    deleting the installed software from the computer, when the user's selection has been made to not agree to the contents of the agreement.

2. A method as recited in claim 1 wherein the steps of said method are executed sequentially by said computer in accordance with a predetermined setup program.

3. A method as recited in claim 1 wherein said software installation is executed by said computer in accordance with a predetermined setup program, and said step of displaying the contents of the agreement, said step of receiving and said step of deleting are executed by said computer running the installed software.

4. A method as recited in claim 1 which further comprises a is step of, after the software is successfully installed, executing the software, wherein said step of displaying the contents of the agreement, said step of receiving and said step of deleting are executed in accordance with instructions from the software.

5. A method as recited in claim 1 which further comprises a step of, after the software is successfully installed, automatically starting up the software, wherein said step of displaying the content of the agreement, said step of receiving and said step of deleting are executed in accordance with instructions from the software started up.

6. A method as recited in claim 1 which further comprises a step of ascertaining whether or not the installed software can be started up, and wherein at least said step of receiving is executed on condition that said step of ascertaining has ascertained that the software can be started up.

7. A method as recited in claim 1 wherein said step of executing software installation writes, into said computer, a non-completely-operable version of the software obtained by changing part of a completely-operable version of the software to be installed, and
    said method further comprises a step of, when said step of receiving has received the user's selection to agree to the contents of the agreement, restoring the changed part of the non-completely-operable version back to its original or pre-change condition for use after the user's selection to agree to the contents of the agreement.

8. A method of installing software in a computer comprising the steps of:
    changing part of the software to be installed;
    determining whether the computer satisfies a predetermined installation condition;
    if the predetermined installation condition is not satisfied, displaying the reasons for failing to satisfy the predetermined installation condition;
    if the predetermined installation condition is satisfied, then installing the software with the changed part and determining whether the installation is successful;
    if the installation is determined to be unsuccessful, displaying an error indication indicating that the installation is unsuccessful;
    if the installation is determined to be successful, then thereafter displaying contents of an agreement concerning the software after the software with the changed part is stored into a storage device;
    receiving a user's selection as to whether or not to agree to the contents of the agreement; and
    when the user's selection has been made to agree to the contents of the agreement, restoring the changed part of the software to a pre-change condition.

9. A machine-readable medium containing a group of instructions of a program executable by a computer for installing given software in said computer, said program comprising the executable steps of:
    determining whether the computer satisfies a predetermined installation condition;
    if the predetermined installation condition is not satisfied, displaying the reasons for failing to satisfy the predetermined installation condition;
    if the predetermined installation condition is satisfied, then executing the software installation and determining whether the software installation is successful;
    if the software installation is determined to be unsuccessful, displaying an error indication indicating that the software installation is unsuccessful;
    if the software installation is determined to be successful, then thereafter displaying contents of an agreement concerning the software;
    receiving a user's selection as to whether or not to agree to the contents of the agreement; and
    deleting the installed software from the computer, when the user's selection has been made to not agree to the contents of the agreement.

10. A machine-readable medium as recited in claim 9 wherein said program is a predetermined setup program, and the executable steps are executed sequentially in accordance with the setup program.

11. A machine-readable medium as recited in claim 9 wherein said program further comprises a step of, after said step of executing software installation, executing the software, and wherein said step of displaying contents of the agreement, said step of receiving and said step of deleting are executed in accordance with instructions given from the software started up.

12. A machine-readable medium as recited in claim 9 wherein said program further comprises a step of, after said step of executing the software installation, automatically starting up the software, and wherein said step of displaying contents of the agreement, said step of receiving and said step of deleting are executed in accordance with instructions from the software started up.

13. A machine-readable medium as recited in claim 9 wherein said step of executing software installation writes, into said computer, a non-completely-operable version of the software obtained by changing part of the software to be installed, and wherein said program further comprises a step of, when said step of receiving has received the user's selection to agree to the contents of the agreement, restoring the changed part of the non-completely-operable version of the software back to a pre-change condition for use after the user's selection to agree to the contents of the agreement.

14. A machine-readable medium containing a group of instructions of a program executable by a computer for installing given software in said computer, said program comprising the steps of:

changing part of the software to be installed;
determining whether the computer satisfies a predetermined installation condition;
if the predetermined installation condition is not satisfied, displaying the reasons for failing to satisfy the predetermined installation condition;
if the predetermined installation condition is satisfied, then installing the software with the changed part and determining whether the installation is successful;
if the installation is determined to be unsuccessful, displaying an error indication indicating that the installation is unsuccessful;
if the installation is determined to be successful, then thereafter displaying contents of an agreement concerning the software after the software with the changed part is stored into a storage device;
receiving a user's selection as to whether or not to agree to the contents of the agreement; and
when the user's selection has been made to agree to the contents of the agreement, restoring the changed part of the software to a pre-change condition.

15. A computer system capable of installing software through improved procedures, said computer system comprising:

a storage device;
a display;
an input device; and
a processor operatively connected to said storage device, display and input device, said processor being adapted to:
check whether the computer system satisfy a predetermined installation condition and, if the computer system does not satisfy the predetermined installation condition, display the reasons for failing to satisfy the predetermined installation condition,
install the software and, if the installation is unsuccessful, display an error message,
display contents of an agreement concerning the software after the software is installed,
receive a user's selection operation, via said input device, as to whether or not to agree to the contents of the agreement, and
delete the installed software in said storage device if the user's selection has been made to not agree to the contents of the agreement.

16. A computer system as recited in claim 15 wherein when the software is to be installed, said processor first writes, into said computer, a non-completely-operable version of the software obtained by changing part of the software to be installed, rather than a completely-operable version of the software, and, once the user's selection has been made to agree to the contents of the agreement, said processor restores the changed part of the non-completely-operable version back to a pre-change condition so that the completely-operable version of the software can be used.

17. A computer system capable of installing software through improved procedures, said computer system comprising:

a storage device;
a display;
an input device; and
a processor operatively connected with said storage device, display and input device, said processor being adapted to:
change part of the software to be installed,
after changing part of the software, determine whether the computer system satisfy a predetermined installation condition and, if the computer system fails to satisfy the predetermined installation condition, display the reasons for failing to satisfy the predetermined installation condition,
if the computer system is determined to satisfy the predetermined installation condition, install the software and display an error message if the installation is unsuccessful,
display contents of an agreement concerning the software after the software is installed,
receive a user's selection operation, via said input device, as to whether or not to agree to the contents of the agreement, and
when the user's selection has been made to agree to the contents of the agreement, restore the changed part of the software to a pre-change condition.

18. A method of installing software in a computer comprising the steps of:

changing part of the software to be installed;
determining whether the computer satisfies a predetermined installation condition;
if the predetermined installation condition is not satisfied, displaying the reasons for failing to satisfy the predetermined installation condition;
if the predetermined installation condition is satisfied, then installing the software with the changed part and determining whether the installation is successful;
if the installation is determined to be unsuccessful, displaying an error indication indicating that the installation is unsuccessful;
if the installation is determined to be successful, then thereafter displaying contents of an agreement concerning the software after the software with the changed part is stored into a storage device;

receiving a user's selection as to whether or not to agree to the contents of the agreement; and when the user's selection has been made to not agree to the contents of the agreement, executing the software with the changed part as it is.

19. A method as recited in claim 18 wherein when the user's selection had been made to agree to the contents of the agreement, restoring the changed part of the software to a pre-change condition thereof so that the software having been restored to its completely-operable condition for use after the user's selection to agree to the contents of the agreement.

20. A machine-readable medium containing a group of instructions of a program executable by a computer for installing given software in said computer, said program comprising the steps of:

changing part of the software to be installed;

determining whether the computer satisfies a predetermined installation condition;

if the predetermined installation condition is not satisfied, displaying the reasons for failing to satisfy the predetermined installation condition;

if the predetermined installation condition is satisfied, then installing the software with the changed part and determining whether the installation is successful;

if the installation is determined to be unsuccessful, displaying an error indication indicating that the installation is unsuccessful;

if the installation is determined to be successful, then thereafter displaying contents of an agreement concerning the software after the software with the changed part is stored into a storage device;

receiving a user's selection as to whether or not to agree to the contents of the agreement; and when the user's selection has been made to not agree to the contents of the agreement, executing the software with the changed part as it is.

21. A computer system capable of installing software through improved procedures, said computer system comprising:

a storage device;

a display;

an input device; and a processor operatively connected with said storage device, display and input device, said processor being adapted to:

change part of the software to be installed, after the software is changed, determine whether the computer system satisfy a predetermined installation condition and, if the computer system fails to satisfy the predetermined installation condition, display the reasons for failing to satisfy the predetermined installation condition, if the computer system is determined to satisfy the predetermined installation condition, install the software and display an error message if the installation is unsuccessful, display contents of an agreement concerning the software after the software is installed, receive a user's selection operation, via said input device, as to whether or not to agree to the contents of the agreement, and when the user's selection has been made to not agree to the contents of the agreement, execute the software with the changed part as it is.

\* \* \* \* \*